United States Patent
Zhu et al.

(10) Patent No.: US 12,212,881 B2
(45) Date of Patent: Jan. 28, 2025

(54) MULTI-DATA TRANSMISSION CHANNEL FUSION APPARATUS AND ELECTRONIC DEVICE

(71) Applicant: HUAWEI TECHNOLOGIES CO., LTD., Shenzhen (CN)

(72) Inventors: Dongke Zhu, Shenzhen (CN); Tao Gong, Dongguan (CN); Pengwei Ma, Shenzhen (CN); Hongli Wang, Shanghai (CN); Xiaowen Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 18/160,859

(22) Filed: Jan. 27, 2023

(65) Prior Publication Data

US 2023/0171373 A1    Jun. 1, 2023

Related U.S. Application Data

(63) Continuation of application No. PCT/CN2021/109351, filed on Jul. 29, 2021.

(30) Foreign Application Priority Data

Jul. 29, 2020 (CN) .......................... 202010746481.6

(51) Int. Cl.
*H04N 5/265* (2006.01)
*H04N 23/60* (2023.01)

(52) U.S. Cl.
CPC ........... *H04N 5/265* (2013.01); *H04N 23/665* (2023.01)

(58) Field of Classification Search
CPC ...... H04N 5/265; H04N 23/665; H04N 25/79; H04N 23/90; H04N 5/262; H04N 23/951; G06F 13/4009; G06F 13/385; Y02D 10/00
See application file for complete search history.

(56) References Cited

U.S. PATENT DOCUMENTS

| | | | |
|---|---|---|---|
| 10,587,391 B2 | 3/2020 | Wiley | |
| 2011/0242342 A1* | 10/2011 | Goma | H04N 13/161 348/E5.024 |

(Continued)

FOREIGN PATENT DOCUMENTS

| | | |
|---|---|---|
| CN | 102638661 A | 8/2012 |
| CN | 103024306 A | 4/2013 |

(Continued)

*Primary Examiner* — Nhan T Tran
(74) *Attorney, Agent, or Firm* — Leydig, Voit & Mayer, Ltd.

(57) ABSTRACT

A electronic device includes a plurality of first photosensitive chips, one first fusion chip, and one processing chip. Each first photosensitive chip is connected to the first fusion chip by a respective data transmission channel and is configured both to generate a MIPI protocol-based data stream and to transmit said data stream to the first fusion chip by the respective data transmission channel. The first fusion chip is connected to the processing chip by a data transmission channel and is configured to converge data streams received via a plurality of data transmission channels connected to the plurality of first photosensitive chips, to obtain a first high-speed convergent data, and to send the first high-speed convergent data to the processing chip. The processing chip is configured to receive the high-speed convergent data stream and obtain an image by using the received data stream.

15 Claims, 6 Drawing Sheets

(56) References Cited

U.S. PATENT DOCUMENTS

2017/0123472 A1    5/2017    Kodavalla
2019/0065430 A1    2/2019    Kim et al.

FOREIGN PATENT DOCUMENTS

| CN | 103281491 | A | | 9/2013 | |
| --- | --- | --- | --- | --- | --- |
| CN | 107371017 | A | | 11/2017 | |
| CN | 107819992 | A | | 3/2018 | |
| CN | 109656415 | A | | 4/2019 | |
| CN | 110677195 | A | | 1/2020 | |
| CN | 110727637 | A | | 1/2020 | |
| CN | 110941582 | A | | 3/2020 | |
| EP | 1238541 | B1 | | 3/2004 | |
| JP | 2009225333 | A | | 10/2009 | |
| KR | 20190143732 | A | * | 12/2018 | ........... H04N 21/236 |
| WO | 2018063233 | A1 | | 4/2018 | |
| WO | 2020037628 | A1 | | 2/2020 | |

* cited by examiner

MULTI-DATA TRANSMISSION CHANNEL FUSION APPARATUS AND ELECTRONIC DEVICE

CROSS-REFERENCE TO RELATED APPLICATIONS

This application is a continuation of International Application No. PCT/CN2021/109351, filed on Jul. 29, 2021, which claims priority to Chinese Patent Application No. 202010746481.6, filed on Jul. 29, 2020. The disclosures of the aforementioned applications are hereby incorporated by reference in their entireties.

TECHNICAL FIELD

The disclosure relates to the field of image data processing, and in particular, to a multi-data transmission channel fusion apparatus and an electronic device.

BACKGROUND

With the further improvement of photographing performance of electronic devices such as a mobile phone, a quantity of camera modules and a pixel of a photosensitive chip also increase. Currently, most data transmission of the camera module is performed by using a mobile industry processor interface (MIPI). A physical layer interface configured to transmit data in the MIPI mainly includes a D physical layer (D-PHY) interface and a C-PHY interface. Image data is received and sent between a processing chip and a photosensitive chip in the camera module by using the D-PHY interface or the C-PHY interface, and the processing chip processes the received image data to obtain an image.

During actual use, an interface of the photosensitive chip and an interface of the processing chip are connected by using a plurality of data transmission lines. When the electronic device needs to be provided with a plurality of camera modules to meet a requirement of photographing performance, the camera module is directly connected to the processing chip by using a plurality of connectors and a plurality of data transmission lines, to implement data transmission. However, two problems may occur when data is transmitted in the foregoing manner. One is that a large quantity of data transmission lines and connectors seriously affect layout and wiring of a printed circuit board (PCB) in an intelligent terminal, and the other is that pins for receiving data are limited in the processing chip. When there are excessive data transmission lines, a processing chip needs to be added and replaced, to increase a quantity of pins for receiving data in the processing chip, resulting in an increase of an area of the processing chip, and an increase of an area occupied by the processing chip on the PCB. Both the problems will increase PCB design difficulty and limit a system optimization space of the intelligent electronic device.

Therefore, an existing image transmission architecture needs to be further improved.

SUMMARY

This application provides a multi-data transmission channel fusion apparatus and an electronic device, to optimize a PCB layout in the electronic device and improve an optimization space of the electronic device.

According to a first aspect, an embodiment of this application provides an electronic device, and the electronic device may include: a plurality of first photosensitive chips, one processing chip, and one first fusion chip.

Each first photosensitive chip is connected to the first fusion chip by using one data transmission channel, and each first photosensitive chip is configured to generate a mobile industry processor interface MIPI protocol-based data stream, and transmit the data stream to the first fusion chip by using the connected data transmission channel; the first fusion chip is connected to the processing chip by using one data transmission channel, and the first fusion chip is configured to converge data streams in a plurality of data transmission channels connected to the plurality of first photosensitive chips, to obtain a first high-speed convergent data stream, and send the first high-speed convergent data stream to the processing chip by using the data transmission channel connected to the processing chip; and the processing chip is configured to receive the data stream by using the connected data transmission channel, and obtain an image by using the received data stream.

By using the electronic device structure, the data streams generated by the plurality of photosensitive chips can be converged by using one first fusion chip, and transmitted to the processing chip by using one data transmission channel, to obtain an image. In a data stream transmission process, the first fusion chip can transmit, to the processing chip by using very few data transmission lines included in one data transmission channel, the data streams generated by the plurality of first photosensitive chips, thereby simplifying PCB design difficulty and optimizing a system architecture of the electronic device.

In a possible design, the first fusion chip includes: a fusion module, a high-speed signal sending module, and a receiving module connected to each first photosensitive chip in a one-to-one correspondence.

Each receiving module is configured to receive a data stream generated by a corresponding first photosensitive chip, and output the received data stream to the fusion module; the fusion module is separately connected to the high-speed signal sending module and each receiving module, and the fusion module is configured to receive a data stream output by each receiving module, converge a plurality of received data streams into convergent data, and output the convergent data to the high-speed signal sending module; and the high-speed signal sending module is connected to the processing chip, and is configured to convert the received convergent data into the first high-speed convergent data stream and then send the first high-speed convergent data stream to the processing chip by using the data transmission channel connected to the processing chip.

By using the electronic device structure, the data streams in the plurality of data transmission channels can be received by using the receiving module, and the data streams in the plurality of data transmission channels are converged by using the first fusion chip and then sent to the processing chip by using one data transmission channel, so that a plurality of data transmission channels do not need to be connected between the first photosensitive chips and the processing chip, and the data streams generated by the plurality of first photosensitive chips can be sent to the processing chip, thereby reducing a quantity of data transmission lines used to transmit the data streams generated by the plurality of first photosensitive chips.

In a possible design, the fusion module includes a first control module, a multiplexer, and a first buffer module. The first buffer module includes an input end corresponding to each receiving module and an output end corresponding to each input end.

Each input end of the first buffer module is connected to a corresponding receiving module, and the first buffer module is configured to buffer a data stream output by the connected receiving module, and output the data stream by using a corresponding output end; a plurality of input ends of the multiplexer are separately connected to different output ends of the first buffer module, an output end of the multiplexer is connected to the high-speed signal sending module, and the multiplexer is configured to converge a plurality of data streams buffered in the first buffer module into convergent data, and then output the convergent data to the high-speed signal sending module; and the first control module is connected to a control end of the multiplexer, and the first control module is configured to control the multiplexer to number the plurality of data streams buffered in the first buffer module, and converge the plurality of numbered data streams.

By using the electronic device structure, the multiplexer can converge, under control of the first control module, the plurality of data streams received from the plurality of data transmission channels.

In a possible design, the fusion module may further include a first data processing module and a storage module.

The first data processing module is connected to the output end of the multiplexer, and the first data processing module is configured to process the convergent data output by the multiplexer and separately output processed convergent data to the high-speed signal sending module and the storage module; and the storage module is configured to store the processed convergent data.

By using the electronic device structure, the convergent data can be preprocessed before the fusion chip transmits the convergent data to the high-speed signal sending module, thereby improving data processing flexibility.

In a possible design, the processing chip includes: an image signal processor, a first signal receiving module, a first distribution module, and a first MIPI protocol processing module.

The first signal receiving module is connected to the first fusion chip by using one data transmission channel, and is configured to receive the first high-speed convergent data stream output by the first fusion chip; the first distribution module is separately connected to the first signal receiving module and the first MIPI protocol processing module, and the first distribution module is configured to receive a data stream output by the first signal receiving module, distribute the received data stream to obtain a plurality of data streams, and output the plurality of data streams to the first MIPI protocol processing module; the first MIPI protocol processing module is connected to the image signal processor, and the first MIPI protocol processing module is configured to receive the plurality of data streams output by the first distribution module, process the plurality of received data streams, and output processed data streams to the image signal processor; and the image signal processor is configured to receive the processed data streams output by the first MIPI protocol processing module, and obtain an image by using the received data streams.

By using the electronic device structure, the first high-speed convergent data stream output by the first fusion chip can be received by using the first signal receiving module, the first high-speed convergent data stream is distributed by using the first distribution module, to obtain a data stream generated by each first photosensitive chip, and a final image is obtained by using the data stream.

In a possible design, each distribution module includes: a data distributor, a second control module, and a second buffer module.

An input end of the data distributor is connected to the first signal receiving module, a plurality of output ends of the data distributor are connected to the second buffer module, and the data distributor is configured to receive data output by the first signal receiving module and distribute the received data into a plurality of data streams; the second buffer module is configured to receive and buffer the plurality of data streams output by the data distributor, and output the plurality of buffered data streams to the first MIPI protocol processing module; and the second control module is connected to a control end of the data distributor, and the second control module is configured to control the data distributor to distribute the data received by the data distributor, to obtain the plurality of data streams.

By using the electronic device structure, the data distributor can distribute the received first high-speed convergent data stream into a plurality of data streams under control of the second control module.

In a possible design, a first control channel is connected between the processing chip and the first fusion chip, and the processing chip is configured to indicate, by using the first control channel, the first fusion chip to control working parameters of the plurality of first photosensitive chips, or second control channels are connected between the processing chip and the plurality of first photosensitive chips, and the processing chip is configured to directly control working parameters of the plurality of first photosensitive chips by using the second control channels.

By using the electronic device structure, the processing chip can directly adjust the working parameters of the plurality of first photosensitive chips, or can control the working parameters of the plurality of first photosensitive chips by using the first fusion chip.

By using the electronic device structure, the processing chip can adjust the working parameters of the plurality of first photosensitive chips, to control the plurality of first photosensitive chips to generate data streams of specific parameters.

In a possible design, the electronic device provided in this embodiment of this application may further include: a plurality of second photosensitive chips and at least one second fusion chip. Each second photosensitive chip is connected to one second fusion chip in the at least one second fusion chip by using one data transmission channel, and each second photosensitive chip is configured to generate an MIPI protocol-based data stream, and transmit the data stream to the connected second fusion chip by using the data transmission channel; and each second fusion chip is connected to the processing chip by using one data transmission channel, and each second fusion chip is configured to converge data streams in a plurality of data transmission channels connected between the second photosensitive chips, to obtain a second high-speed convergent data stream and send the second high-speed convergent data stream to the processing chip by using the data transmission channel connected to the processing chip.

The processing chip further includes a second signal receiving module in a one-to-one correspondence with each second fusion chip, a second distribution module in a one-to-one correspondence with each second signal receiving module, and a second MIPI protocol processing module in a one-to-one correspondence with each second distribution module. Each second signal receiving module is configured to be connected to a corresponding second fusion chip by using one data transmission channel, and is configured to receive a second high-speed convergent data stream output by the connected second fusion chip; each second distribution module is connected to a corresponding second signal receiving module and a corresponding second MIPI protocol processing module, and each second distribution module is configured to receive data output by the connected second signal receiving module, distribute the received data to obtain a plurality of data streams, and output the plurality of data streams to the connected second MIPI protocol processing module; and each second MIPI protocol processing module is connected to the image signal processor, and each second MIPI protocol processing module is configured to receive the plurality of data streams output by the connected second distribution module, process the plurality of received data streams, and output processed data streams to the image signal processor.

By using the electronic device structure, when a quantity of interfaces of the first fusion chip is limited or spatial distribution of the photosensitive chips is limited, a plurality of fusion chips can be disposed based on mounting positions of the photosensitive chips, to meet a data transmission requirement of the electronic device.

According to a second aspect, an embodiment of this application provides a multi-data transmission channel fusion apparatus, and the apparatus includes the first fusion chip according to the first aspect and any possible design of this embodiment of this application. The first fusion chip is configured to converge data streams in a plurality of data transmission channels connected to a plurality of first photosensitive chips, to obtain a first high-speed convergent data stream, and send the first high-speed convergent data stream to a processing chip by using one data transmission channel connected to the processing chip.

By using the apparatus structure, the data streams in the plurality of data transmission channels can be transmitted to the processing chip by using one data transmission channel, to reduce a quantity of data transmission channels, thereby reducing a quantity of data transmission lines.

In a possible design, the apparatus includes: at least one second fusion chip. Each second fusion chip is configured to be connected to a plurality of second photosensitive chips by using a plurality of data transmission channels, and be connected to the processing chip by using one data transmission channel; and each second fusion chip is configured to converge data streams in the plurality of data transmission channels connected to the plurality of second photosensitive chips, to obtain a second high-speed convergent data stream, and send the second high-speed convergent data stream to the processing chip by using the data transmission channel connected to the processing chip.

By using the apparatus structure, when a quantity of interfaces of the first fusion chip is limited and spatial distribution of the photosensitive chips is limited, a quantity and positions of the fusion chips can be set based on mounting positions of the photosensitive chips, to meet a data transmission requirement.

According to a third aspect, an embodiment of this application provides a data transmission method, and the method may be performed by the multi-data transmission channel fusion apparatus according to the second aspect and any possible design of this embodiment of this application. Specifically, the method includes the following steps: obtaining data streams in data transmission channels connected to a plurality of photosensitive chips; and converging a plurality of obtained data streams into at least one high-speed convergent data stream, and sending the at least one high-speed convergent data stream to a processing chip.

By using the method, a plurality of data streams generated by the plurality of photosensitive chips can be converged and then transmitted, to reduce a quantity of data transmission lines used to transmit the data streams generated by the plurality of photosensitive chips, and the data streams are further converged, to increase a data transmission speed.

In a possible design, the converging a plurality of obtained data streams into at least one high-speed convergent data stream includes: numbering the plurality of obtained data streams, and converging the plurality of numbered data streams, to obtain the at least one high-speed convergent data stream.

By using the method, the plurality of data streams can be further converged to obtain a high-speed convergent data stream, thereby reducing a quantity of data transmission channels used to transmit the plurality of data streams.

In a possible design, before the obtaining data streams in data transmission channels connected to a plurality of photosensitive chips, the multi-data transmission channel fusion method provided in this embodiment of this application further includes:
receiving a control signal sent by the processing chip, and adjusting working parameters of the plurality of connected photosensitive chips in response to the control signal.

By using the method, a data stream that meets a requirement can be output based on the control signal sent by the processing chip.

According to a fourth aspect, an embodiment of this application provides a data processing method, and the method may be performed by the processing chip in the electronic device according to the first aspect and any possible design of this embodiment of this application. Specifically, the method may include the following steps: receiving at least one high-speed convergent data stream, where each high-speed convergent data stream includes a plurality of data streams generated by a plurality of photosensitive chips; distributing the at least one received high-speed convergent data stream into a plurality of data streams; and processing the plurality of data streams, to obtain an image.

By using the method, at least one high-speed convergent data stream including data streams generated by the plurality of photosensitive chips can be received by using very few data transmission lines, and the received high-speed convergent data stream can be processed to obtain an image.

In a possible design, the distributing at least one received high-speed convergent data stream into a plurality of data streams includes: performing clock recovery on the at least one high-speed convergent data stream; and distributing, by using a numbered identifier in the at least one high-speed convergent data stream, the at least one high-speed convergent data stream after the clock recovery, to obtain a data stream corresponding to each photosensitive chip.

By using the method, the high-speed convergent data stream can be distributed based on the number identifier in the high-speed convergent data stream, to obtain a data stream corresponding to each photosensitive chip, so that the processing chip processes the data stream to obtain the image.

In a possible design, before the receiving at least one high-speed convergent data stream, the data processing method provided in this embodiment of this application further includes:
sending control signals to the plurality of photosensitive chips. The control signals are used to control working parameters of the plurality of photosensitive chips, so that the plurality of photosensitive chips generate data streams.

By using the method, a data stream that meets a requirement can be obtained by adjusting the working parameters of the plurality of photosensitive chips.

DESCRIPTION OF EMBODIMENTS

A multi-data transmission channel fusion apparatus and an electronic device provided in embodiments of this application may be applied to an intelligent terminal such as a mobile phone or a tablet, and may be further applied to technical fields such as a drone, an automatic driving system, and a security protection system.

Figure 1:
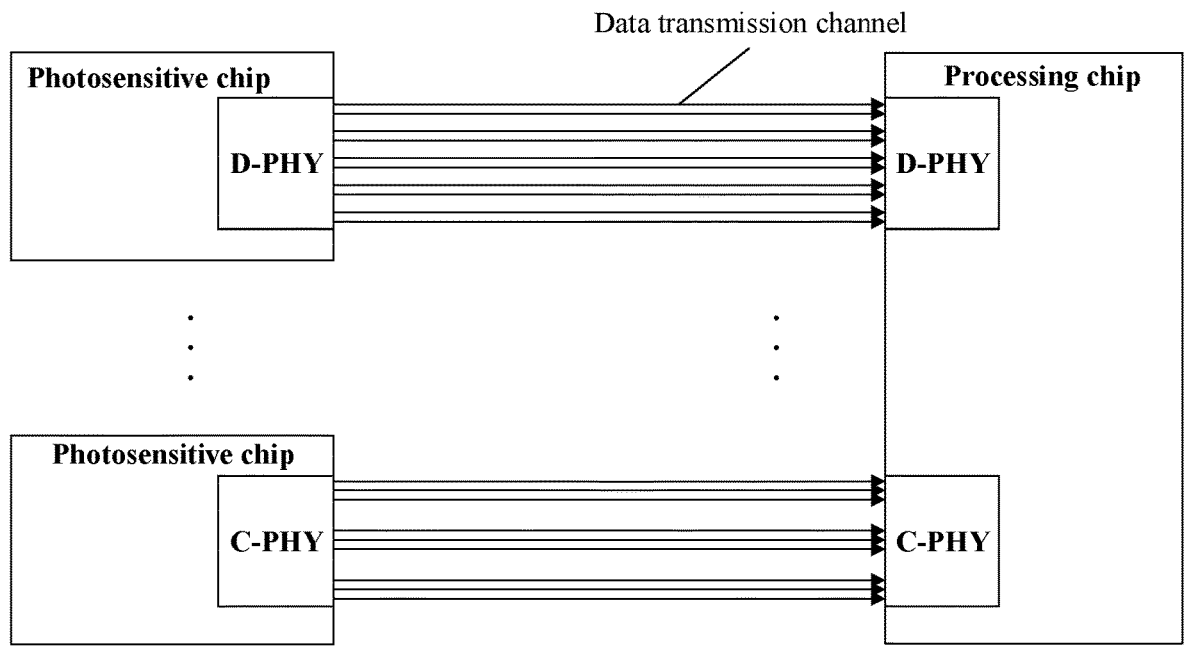
FIG. 1 is a schematic diagram of a structure of an application scenario.

Currently, FIG. 1 is a structural block diagram of an electronic device. In FIG. 1, the electronic device includes a plurality of photosensitive chips, a plurality of data transmission channels, and a processing chip. Each photosensitive chip is connected to the processing chip by using one data transmission channel, to transmit a data stream generated by the photosensitive chip to the processing chip by using the connected data transmission channel, and the processing chip receives, by using the plurality of data transmission channels, data streams generated by the plurality of photosensitive chips, processes the plurality of received data streams, to obtain an image, and displays the image by using a display screen (not shown) of the electronic device. Each data transmission channel has a plurality of data transmission lines. In some application scenarios, a connector is connected between the processing chip and the photosensitive chip.

In an actual application, the photosensitive chip is mainly connected to the data transmission channel by using a disposed D-PHY interface or a disposed C-PHY interface. A data transmission channel connected to each D-PHY interface generally has 10 data transmission lines, and a data transmission channel connected to each C-PHY interface generally has nine data transmission lines. As a requirement of the electronic device for photographing performance gradually increases, a quantity of photosensitive chips in the electronic device also gradually increases, and the increase of the photosensitive chips causes an increase of a quantity of data transmission channels. In addition, the processing chip also needs to increase a corresponding data receiving interface and increase a quantity of connectors connected between the processing chip and the photosensitive chips, to receive a data stream generated by a newly increased photosensitive chip. However, an increased component causes an area occupied by the data transmission lines, the connectors, and the processing chip on a PCB in the electronic device to increase, affecting PCB layout and wiring. When a new function is added to the electronic device, the PCB cannot provide a corresponding position for the newly added function, limiting an optimization space of the electronic device.

Consequently, when the electronic device in the conventional technology transmits data streams generated by the photosensitive chips, PCB design difficulty is increased and the optimization space of the electronic device is limited. Therefore, embodiments of this application provide a multi-data transmission channel fusion apparatus and an electronic device, to simplify the PCB design difficulty and optimize a system architecture of the electronic device.

In embodiments of this application, "or" describes an association relationship of associated objects, and indicates that two relationships may exist. For example, A or B may indicate cases in which A exists only and B exists only. A and B may be singular or plural.

The term "connection" related in this application describes a connection relationship between two objects, and may indicate two connection relationships. For example, a connection between A and B may indicate two cases: A is directly connected to B, and A is connected to B by using C.

In embodiments of this application, "example", "in some embodiments", "in another embodiment", and the like are used to represent an example, an illustration, or a description. Any embodiment or design scheme described as an "example" in this application should not be explained as being more preferred or having more advantages than another embodiment or design scheme. Exactly, the word "for example" is used to present a concept in a specific manner.

It should be noted that, in embodiments of this application, the terms "first", "second", and the like are only used for a purpose of description, but should not be understood as an indication or implication of relative importance or an indication or implication of a sequence. In embodiments of this application, "equal to" may be used together with "greater than", and this is applicable to a technical solution used when "greater than" is used; or "equal to" may be used together with "less than", and this is applicable to a technical solution used when "less than" is used. It should be noted that, when "equal to" is used together with "greater than", "equal to" is not used together with "less than"; or when "equal to" is used together with "less than", "equal to" is not used together with "greater than".

Figure 2:
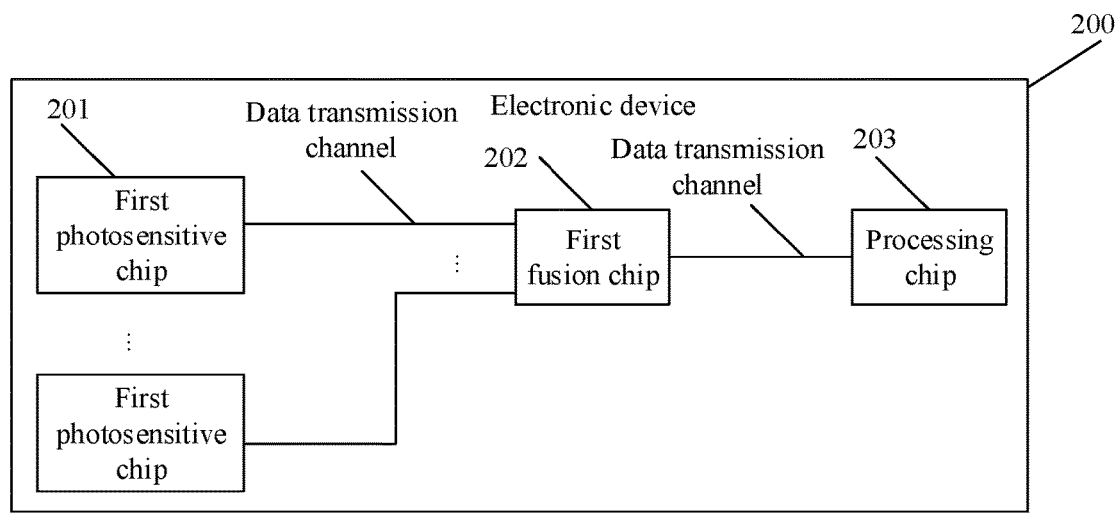
FIG. 2 is a schematic diagram of a structure of an electronic device according to an embodiment.

FIG. 2 is a schematic diagram of a structure of an electronic device according to an embodiment of this application. The electronic device 200 includes a plurality of first photosensitive chips 201, one first fusion chip 202, and one processing chip 203.

Each first photosensitive chip 201 is connected to the first fusion chip 202 by using one data transmission channel, and the first fusion chip 202 is connected to the processing chip 203 by using one data transmission channel.

Each first photosensitive chip 201 may be configured to generate a mobile industry processor interface MIPI protocol-based data stream, and transmit the data stream to the first fusion chip by using the connected data transmission channel; the first fusion chip 202 is configured to converge data streams in a plurality of data transmission channels connected to the plurality of first photosensitive chips 201, to obtain a first high-speed convergent data stream, and send the first high-speed convergent data stream to the processing chip 203 by using the data transmission channel connected to the processing chip 203; and the processing chip 203 is configured to receive the data stream by using the connected data transmission channel, and obtain an image by using the received data stream.

During actual use, the plurality of first photosensitive chips 201 and the processing chip 203 in the electronic device 200 may be disposed on a same PCB in the electronic device 200, or may be disposed on different PCBs in the electronic device 200. If the plurality of first photosensitive chips 201 and the processing chip 203 are disposed on different PCBs, in this embodiment of this application, the first fusion chip 202 connected to the plurality of first photosensitive chips 201 is preferentially disposed on a PCB corresponding to the plurality of photosensitive chips, to reduce lengths of a plurality of data transmission lines in data transmission channels between the first fusion chip 202 and the plurality of first photosensitive chips 201 and reduce an area occupied by the data transmission lines on the PCB, thereby simplifying PCB design difficulty and optimizing a system architecture of the electronic device.

In an example, when distances among a plurality of photosensitive chips included in the electronic device 200 are relatively short, one first fusion chip 202 may be used to be connected to all the first photosensitive chips in the electronic device 200, to receive, by using the first fusion chip 202, data streams generated by all the photosensitive chips in the electronic device, thereby reducing a quantity of components in the electronic device and an area occupied by the fusion chip on the PCB.

In another example, when distances among a plurality of photosensitive chips included in the electronic device are relatively long, a quantity of fusion chips of the electronic device 200 and positions of the fusion chips disposed on the PCB of the electronic device may be selected based on mounting positions of the photosensitive chips in the electronic device. Therefore, the following case is avoided: Excessive data transmission lines exist on a PCB where the processing chip 203 is located and occupy a relatively large area on the PCB where the processing chip 203 is located, increasing the PCB design difficulty.

When the first fusion chip 202 is configured to converge data streams generated by the plurality of first photosensitive chips 201, the plurality of first photosensitive chips 201 are connected to the first fusion chip 202, and the first fusion chip 202 is connected to the processing chip 203. The first fusion chip 202 converges the data streams in the plurality of data transmission channels into high-speed convergent data, and transmits the high-speed convergent data to the processing chip by using one data transmission channel connected to the processing chip 203.

The following describes specific structures of the first fusion chip 202 and the processing chip 203.

1. First Fusion Chip 202

The first fusion chip 202 is separately connected to different first photosensitive chips 201 by using a plurality of data transmission channels, the first fusion chip 202 is further connected to the processing chip 203 by using one data transmission channel, and the first fusion chip 202 is configured to converge data streams in the plurality of data transmission channels connected to the plurality of first photosensitive chips 201, to obtain a first high-speed convergent data stream, and send the first high-speed convergent data stream to the processing chip by using the data transmission channel connected to the processing chip 203.

Figure 3:
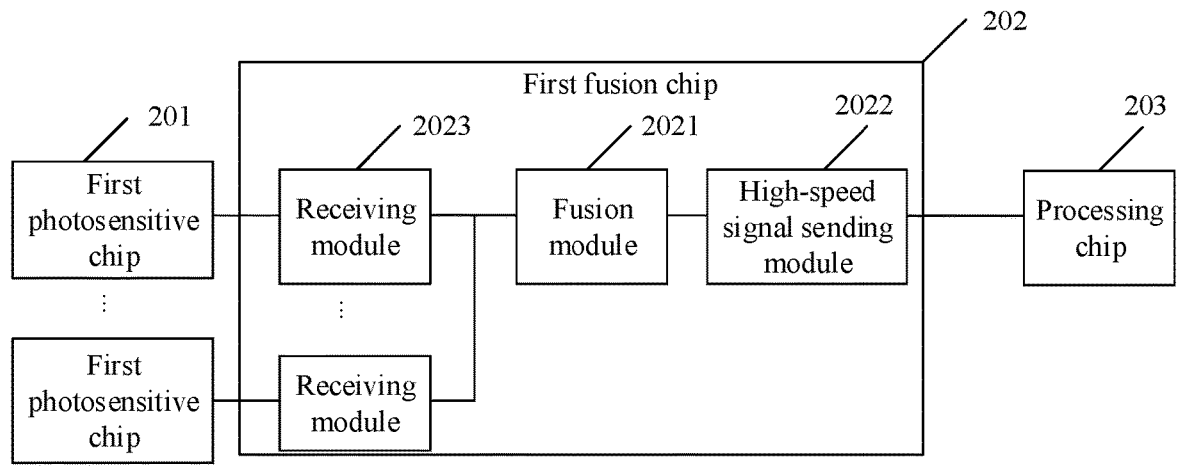
FIG. 3 is a schematic diagram of a structure of a first fusion chip according to an embodiment.

Specifically, as shown in FIG. 3, the first fusion chip 202 may include: a fusion module 2021, a high-speed signal sending module 2022, and a receiving module 2023 connected to each first photosensitive chip 201 in a one-to-one correspondence. Each receiving module 2023 may be configured to receive a data stream generated by a corresponding first photosensitive chip 201, and output the received data stream to the fusion module 2021; the fusion module 2021 is separately connected to the high-speed signal sending module 2022 and each receiving module 2023, and the fusion module 2021 may be configured to receive a data stream output by each receiving module 2023, converge a plurality of received data streams into convergent data, and output the convergent data to the high-speed signal sending module 2022; and the high-speed signal sending module 2022 may be connected to the processing chip 203, and is configured to convert the received convergent data into the first high-speed convergent data stream and then send the first high-speed convergent data stream to the processing chip 203 by using one data transmission channel connected to the processing chip 203.

Specifically, if the first photosensitive chip 201 transmits data by using a D-PHY interface, a correspondingly connected receiving module 2023 is a D-PHY receiving module; or if the first photosensitive chip 201 transmits data by using a C-PHY interface, a correspondingly connected receiving module is a C-PHY receiving module.

In an actual application, each receiving module 2023 of the first fusion chip 202 is connected to a corresponding first photosensitive chip 201 by using one data transmission channel. During specific implementation, a plurality of fixed pins may be disposed on each receiving module 2023 of the first fusion chip 202, and the first photosensitive chip 201 may be connected to the first fusion chip 202 by using one data transmission channel and a plurality of fixed pins on the receiving module 2023 of the first fusion chip 202.

It should be noted that, a quantity of pins disposed for each receiving module 2023 of the first fusion chip 202 may be set based on a type of an interface that is on the first photosensitive chip 201 connected to the receiving module 2023 and that is used to transmit data. For example, if the first photosensitive chip 201 connected to the receiving module 2023 transmits data by using the D-PHY interface, the quantity of pins on the receiving module 2023 may be 10; or if the first photosensitive chip connected to the receiving module 2023 transmits data by using the C-PHY interface, the quantity of pins on the receiving module 2023 is 9. A quantity of data transmission lines in a data transmission channel connected between the receiving module 2023 and the first photosensitive chip 201 is the same as the quantity of pins on the receiving module 2023.

During specific use, a data stream generated by the first photosensitive chip 201 is transmitted by using an MIPI protocol processing module. Before the first fusion chip 202 receives, by using the data transmission channel, the data stream output by the first photosensitive chip 201, the MIPI protocol processing module in the first photosensitive chip 201 first converts data acquired by the first photosensitive chip into a CSI-2 data stream, and then transmits the data stream to the first fusion chip 202 by using a data transmission channel, and each receiving module 2023 in the first fusion chip 202 receives, by using a plurality of pins, the data stream generated by the first photosensitive chip 201 in the connected data transmission channel. The receiving module 2023 may be a D-PHY receiving module or a C-PHY receiving module. The data stream includes a packet header and a packet trailer.

Figure 4:
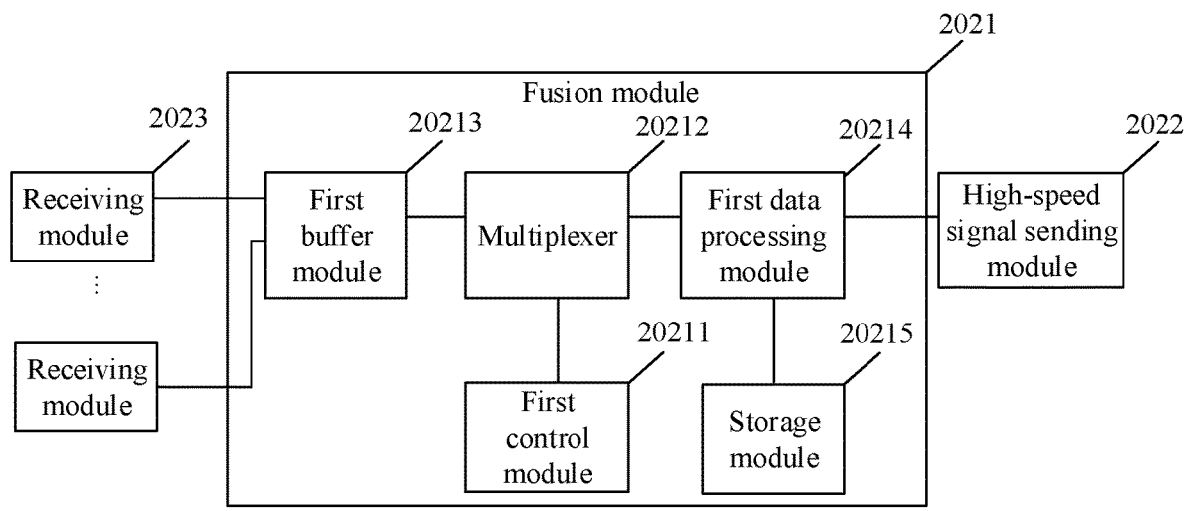
FIG. 4 is a schematic diagram of a structure of a fusion module according to an embodiment.

Specifically, as shown in FIG. 4, the fusion module 2021 may include a first control module 20211, a multiplexer 20212, and a first buffer module 20213. The first buffer module 20213 includes an input end corresponding to each receiving module 2023 and an output end corresponding to each input end.

Specifically, each input end of the first buffer module 20213 is connected to a corresponding receiving module 2023, and the first buffer module is configured to buffer a data stream output by the connected receiving module 2023 and output the data stream by using a corresponding output end. Input ends of the multiplexer 20212 are separately connected to different output ends of the first buffer module 20213, an output end of the multiplexer 20212 is connected to the high-speed signal sending module 2022, and the multiplexer 20212 may be configured to converge a plurality of data streams buffered in the first buffer module 20213 into convergent data, and then output the convergent data to the high-speed signal sending module 2022. The first control module 20211 is connected to a control end of the multiplexer 20212, and the first control module 20211 may be configured to control the multiplexer 20212 to number the plurality of data streams buffered in the first buffer module 20213 and converge the plurality of numbered data streams.

It should be understood that, to improve data processing flexibility, the fusion module 2021 provided in this embodiment of this application further includes: a first data processing module 20214 and a storage module 20215, and the first data processing module is configured to perform data preprocessing on the convergent data. The first data processing module 20214 may be, but is not limited to, an image processing unit.

Specifically, the first data processing module 20214 is connected to the output end of the multiplexer 20212, and the first data processing module 20214 may be configured to process the convergent data output by the multiplexer 20212 and separately output processed convergent data to the high-speed signal sending module 2022 and the storage module 20215; and the storage module 20215 may be configured to store the processed convergent data.

It should be understood that, if a quantity of disposed receiving modules of the first fusion chip is limited, and when the electronic device 200 includes a plurality of photosensitive chips disposed at different positions, to ensure that the processing chip 203 can obtain data streams generated by all the photosensitive chips, when the electronic device 200 includes a plurality of second photosensitive chips, the electronic device 200 further includes at least one second fusion chip.

Each second photosensitive chip is connected to one second fusion chip in the at least one second fusion chip by using one data transmission channel, and each second photosensitive chip is configured to generate an MIPI protocol-based data stream, and transmit the data stream to the connected second fusion chip by using the data transmission channel; and each second fusion chip is connected to the processing chip by using one data transmission channel, and each second fusion chip is configured to converge data streams in a plurality of data transmission channels connected between the second photosensitive chips, to obtain a second high-speed convergent data stream and send the second high-speed convergent data stream to the processing chip by using the data transmission channel connected to the processing chip.

It should be understood that a structure of the second fusion chip is the same as a structure of the first fusion chip 202 provided in this embodiment of this application, and is not repeatedly described in this embodiment of this application.

2. Processing Chip 203

The processing chip 203 is connected to the first fusion chip 202 by using one data transmission channel, and is configured to receive a data stream by using the connected data transmission channel, and obtain an image by using the received data stream.

Figure 5:
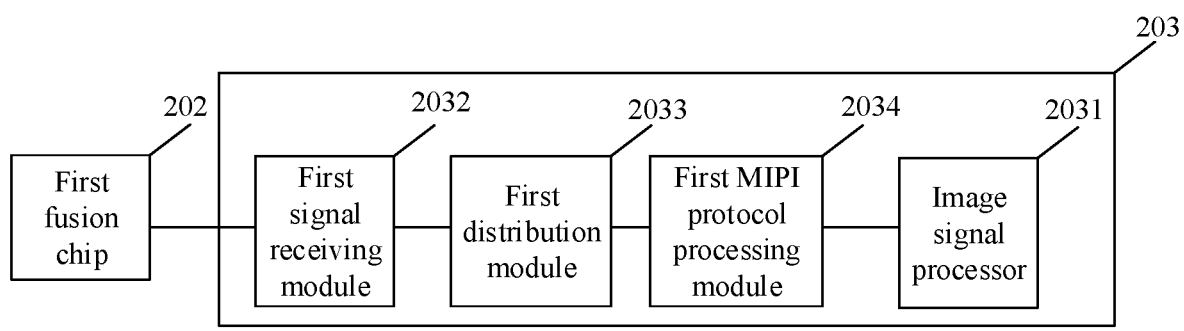
FIG. 5 is a schematic diagram of a structure of a processing chip according to an embodiment.

Specifically, as shown in FIG. 5, the processing chip 203 specifically includes an image signal processor 2031, a first signal receiving module 2032, a first distribution module 2033, and a first MIPI protocol processing module 2034.

Specifically, the first signal receiving module 2032 is connected to the first fusion chip 202 by using one data transmission channel, and may be configured to receive the first high-speed convergent data stream output by the first fusion chip 202; the first distribution module 2033 is separately connected to the first signal receiving module 2032 and the first MIPI protocol processing module 2034, and the first distribution module 2033 may be configured to receive a data stream output by the first signal receiving module 2032, distribute the received data stream to obtain a plurality of data streams, and output the plurality of data streams to the connected first MIPI protocol processing module 2034; the first MIPI protocol processing module 2034 may be connected to the image signal processor 2031, and the first MIPI protocol processing module 2034 may be configured to receive the plurality of data streams output by the first distribution module 2033, process the plurality of received data streams, and output processed data streams to the image signal processor 2031; and the image signal processor 2031 may be configured to receive the processed data streams output by the first MIPI protocol processing module 2034, and obtain the image by using the received data streams.

Specifically, the processing chip provided in this embodiment of this application may further include a clock recovery module. The clock recovery module is separately connected to the first signal receiving module 2032 and the first distribution module 2033, and the clock recovery module may be configured to recover a clock signal of the high-speed convergent data stream received by the first signal receiving module 2032.

In an example, the processing chip 203 in the electronic device 200 may be connected to an output end of the first fusion chip 202 by using a high-speed serial interface.

During specific use, the data stream output by the first photosensitive chip 201 is data processed by the MIPI protocol processing module, the high-speed convergent data stream that is output by the first fusion chip and that is received by the processing chip 203 is an MIPI data packet, and the image signal processor 2031 cannot directly process the data stream. Therefore, after the first distribution module 2033 distributes the high-speed convergent data stream into a plurality of data streams, and before the data streams are transmitted to the image signal processor 2031, packet headers and packet trailers of the data streams need to be first removed by using the first MIPI protocol processing module 2034, so that the image signal processor 2031 processes processed data streams to obtain the image.

Figure 6:
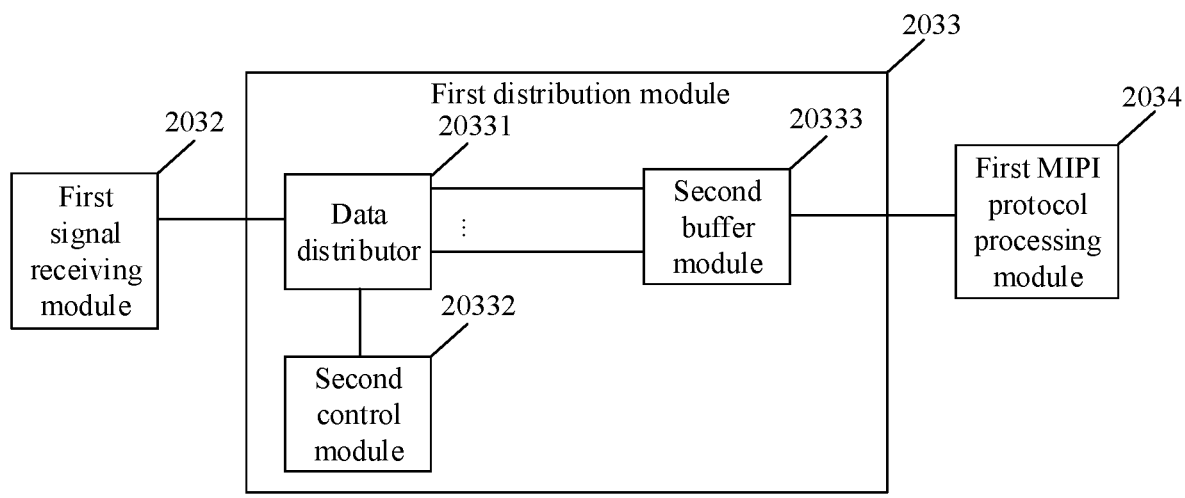
FIG. 6 is a schematic diagram of a structure of a first distribution module according to an embodiment.

As shown in FIG. 6, the first distribution module 2033 may include: a data distributor 20331, a second control module 20332, and a second buffer module 20333.

Specifically, an input end of the data distributor 20331 is connected to the first signal receiving module 2032, a plurality of output ends of the data distributor 20331 are connected to the second buffer module 20333, and the data distributor 20331 may be configured to receive a data stream output by the first signal receiving module 2032 and distribute the received data into a plurality of data streams; the second buffer module 20333 is configured to receive and buffer the plurality of data streams output by the output ends of the data distributor 20331, and output the plurality of buffered data streams to the first MIPI protocol processing module 2034; and the second control module 20332 is connected to a control end of the data distributor 20331, and the second control module 20332 may be configured to control the data distributor 20331 to distribute the data received by the data distributor 20331, to obtain the plurality of data streams.

Optionally, a first control channel is connected between the processing chip 203 and the first fusion chip 202, and the processing chip 203 is configured to indicate, by using the first control channel, the first fusion chip 202 to control a working parameter of the first photosensitive chip 201 connected to the fusion chip. The working parameter may include, but is not limited to, a pixel, an exposure time, a frame rate, and a color depth.

Optionally, second control channels are connected between the processing chip 203 and the plurality of first photosensitive chips 201 provided in this embodiment of this application, and the processing chip 203 is configured to directly control working parameters of the plurality of first photosensitive chips 201 by using the second control channels.

It should be understood that when the electronic device 200 includes a plurality of second photosensitive chips and at least one second fusion chip, the processing chip 203 further includes a second signal receiving module in a one-to-one correspondence with each second fusion chip, a second distribution module in a one-to-one correspondence with each second signal receiving module, and a second MIPI protocol processing module in a one-to-one correspondence with each second distribution module.

Specifically, each second signal receiving module is configured to be connected to a corresponding second fusion chip by using one data transmission channel, and is configured to receive a second high-speed convergent data stream output by the connected second fusion chip; each second distribution module is connected to a corresponding second signal receiving module and a corresponding second MIPI protocol processing module, and each second distribution module is configured to receive data output by the connected second signal receiving module, distribute the received data to obtain a plurality of data streams, and output the plurality of data streams to the connected second MIPI protocol processing module; and each second MIPI protocol processing module is connected to the image signal processor 2031, and each second MIPI protocol processing module is configured to receive the plurality of data streams output by the connected second distribution module, process the plurality of received data streams, and output processed data streams to the image signal processor 2031.

A structure of the second signal receiving module is the same as a structure of the first signal receiving module provided in the foregoing embodiment of this application, a structure of the second distribution module is the same as a structure of the first distribution module provided in embodiment of this application, and a structure of the MIPI protocol processing module is the same as a structure of the MIPI protocol processing module provided in the foregoing embodiment of this application, and details are not described in this application again.

The following describes a working process of the electronic device by using two cases in which two fusion chips are disposed in the electronic device and one fusion chip is disposed in the electronic device as examples.

Case 1: The electronic device includes five photosensitive chips A, B, C, D, and E, one fusion chip F, and one processing chip G. The photosensitive chip A is a 40 megapixel photosensitive chip of an ultra-high definition camera module, the photosensitive chip B is a 32 megapixel photosensitive chip of a high definition camera module, the photosensitive chip C is a 20 megapixel photosensitive chip of a wide-angle camera module, the photosensitive chip D is an 8 megapixel photosensitive chip of a long-focus camera module, and the photosensitive chip E is an 8 megapixel photosensitive chip of an optical zoom camera module.

The photosensitive chips A and B transmit output image data to the fusion chip F by using C-PHY interfaces, and the photosensitive chips C, D, and E transmit output image data to the fusion chip F by using D-PHY interfaces. The photosensitive chip A is connected to a first input end of the fusion chip F by using nine data transmission lines, the photosensitive chip B is also connected to a second input end of the fusion chip F by using nine data transmission lines, the photosensitive chip C is connected to a third input end of the fusion chip F by using 10 data transmission lines, the photosensitive chip D is connected to a fourth input end of the fusion chip F by using 10 data transmission lines, the photosensitive chip E is connected to a fifth input end of the fusion chip F by using 10 data transmission lines, and the fusion chip F is connected to the processing chip G by using one high-speed transmission interface. That is, 48 data transmission lines are connected between the five photosensitive chips and the fusion chip. One high-speed transmission interface includes two pairs of data transmission lines, and each pair of data transmission lines includes two data transmission lines.

During specific implementation, the processing chip G is connected to the fusion chip F, and adjusts working parameters of the photosensitive chips A, B, C, D, and E by sending a control signal to the fusion chip F, so that the photosensitive chips A, B, C, D, and E acquire data streams of specific parameters. The data streams are transmitted to the fusion chip F by using the 48 connected data transmission lines. After receiving the data streams output by the photosensitive chips A, B, C, D, and E, the fusion chip F numbers the received data streams, converges the plurality of numbered data streams to obtain a first high-speed convergent data stream, and then sends the first high-speed convergent data stream to the processing chip G by using the high-speed transmission interface connected to an output end of the fusion chip F. The data transmission lines of the photosensitive chip A have a transmission rate of 2.1 Gsps and a total bandwidth of 14.4 Gbps, the data transmission lines of the photosensitive chip B have a transmission rate of 1.69 Gsps and a total bandwidth of 11.52 Gbps, the data transmission lines of the photosensitive chip C have a transmission rate of 1.05 Gsps and a total bandwidth of 7.42 Gbps, the data transmission lines of the photosensitive chip D have a transmission rate of 720 Mbps and a total bandwidth of 2.88 Gbps, and the data transmission lines of the photosensitive chip E have a transmission rate of 720 Mbps and a total bandwidth of 2.88 Gbps. A total bandwidth of the data transmission lines between the processing chip G and the fusion chip F is at least 19.04 Gbps.

The processing chip G can receive the first high-speed convergent data stream by using one high-speed transmission interface, restore the first high-speed convergent data stream into five data streams based on data of a packet header and data of a packet trailer in the first high-speed convergent data stream, and then remove the packet header and the packet trailer by using the MIPI protocol processing module. The data stream with the packet header and the packet trailer being removed is output to an image signal processor of the processing chip G, and the image signal processor processes the received data by using an image algorithm to output an image. The image signal processor in the processing chip G may invoke a data stream output by one photosensitive chip, or may simultaneously invoke data streams output by a plurality of photosensitive chips, and an internal algorithm can be flexibly set. For example, fusion can be performed on a plurality of frames of images of a same photosensitive chip to increase a dynamic range and perform noise reduction processing, or fusion and processing can be performed on data streams of a plurality of different photosensitive chips to improve a depth of field and background blur, or achieve a better zoom effect.

It can be learned that 48 data transmission lines are connected between the five photosensitive chips and the fusion chip F, and only four data transmission lines are required between the fusion chip F and the processing chip G. Therefore, when the fusion chip F is connected across the five photosensitive chips and the processing chip G, wiring of 44 data transmission lines can be reduced on a PCB where the processing chip G is located, so that the PCB design difficulty is simplified, or positions of other components can be reserved on the PCB, thereby optimizing the system architecture of the electronic device.

Case 2: The electronic device includes five photosensitive chips A, B, C, D, and E, two fusion chips F and G, and one processing chip H. The photosensitive chip A is an 8 megapixel photosensitive chip, the photosensitive chip B is a 5 megapixel photosensitive chip, the photosensitive chip C is a 2 megapixel photosensitive chip, the photosensitive chip D is an 8 megapixel photosensitive chip, and the photosensitive chip E is a 2 megapixel photosensitive chip.

The photosensitive chips A, B, and C transmit output image data to the fusion chip F by using D-PHY interfaces, and the photosensitive chips D and E transmit output image data to the fusion chip G by using D-PHY interfaces. The photosensitive chip A is connected to a first input end of the fusion chip F by 10 data transmission lines, the photosensitive chip B is connected to a second input end of the fusion chip F by 10 data transmission lines, the photosensitive chip C is connected to a third input end of the fusion chip F by 10 data transmission lines, the photosensitive chip D is connected to a first input end of the fusion chip G by 10 data transmission lines, the photosensitive chip E is connected to a second input end of the fusion chip G by 10 data transmission lines, and each of the fusion chips F and G is connected to the processing chip H by one high-speed transmission interface. That is, 50 data transmission lines are connected between the five photosensitive chips and the fusion chips, and the fusion chips F and G are respectively connected to the processing chip H by using two data transmission lines.

During specific implementation, the processing chip H controls working parameters of the photosensitive chips A, B, C, D, and E by separately sending control signals to the fusion chip F and the fusion chip G, so that the photosensitive chips A, B, C, D, and E acquire data streams of specific parameters. The data streams output by the photosensitive chips A, B, and C are transmitted to the fusion chip F by using 30 data transmission lines. After receiving the data streams output by the photosensitive chips A, B, and C, the fusion chip F numbers the received data streams, converges the numbered data streams into a high-speed convergent data stream, and then sends the high-speed convergent data stream to the processing chip H by using one high-speed transmission interface connected to an output end of the fusion chip F. The data streams output by the photosensitive chips D and E are transmitted to the fusion chip G by using the connected 20 data transmission lines. After receiving the data streams output by the photosensitive chips D and E, the fusion chip G numbers the received data streams, converges the numbered data streams into a high-speed convergent data stream, and then sends the high-speed convergent data stream to the processing chip H by using one high-speed transmission interface connected to an output end of the fusion chip G.

The data transmission lines of the photosensitive chip A have a transmission rate of 1.152 Gbps and a total bandwidth of 4.608 Gbps, the data transmission lines of the photosensitive chip B have a transmission rate of 720 Mbps and a total bandwidth of 2.88 Gbps, the data transmission lines of the photosensitive chip C have a transmission rate of 288 Mbps and a total bandwidth of 1.152 Gbps, the data transmission lines of the photosensitive chip D have a transmission rate of 1.152 Gbps and a total bandwidth of 4.608 Gbps, and the data transmission lines of the photosensitive chip E have a transmission rate of 288 Mbps and a total bandwidth of 1.152 Gbps. A transmission rate of the high-speed transmission interface of the fusion chip F is 8.64 Gbps, and a transmission rate of the high-speed transmission interface of the fusion chip G is 5.76 Gbps.

The processing chip H can receive the high-speed convergent data streams by using the high-speed transmission interfaces of the fusion chip F and the fusion chip G, restore the received high-speed convergent data streams into five data streams based on numbers of packet headers in the high-speed convergent data streams, and then remove the packet headers and packet trailers by using the MIPI protocol processing module. The data stream with the packet headers and the packet trailers being removed is output to an image signal processor of the processing chip H, and the image signal processor processes the received data by using an image algorithm to output an image. The image signal processor in the processing chip H may invoke a data stream output by one photosensitive chip, or may simultaneously invoke data streams output by a plurality of photosensitive chips, and an internal algorithm can be flexibly set. For example, fusion can be performed on a plurality of frames of images of a same photosensitive chip to increase a dynamic range and perform noise reduction processing, or fusion and processing can be performed on data streams of a plurality of different photosensitive chips to improve a depth of field and background blur.

It can be learned that the 50 data transmission lines are connected between the five photosensitive chips and the fusion chip F as well as the fusion chip G, and only four data transmission lines are required between the fusion chip F as well as the fusion chip G and the processing chip H. Therefore, when the fusion chip F and the fusion chip G are connected across the five photosensitive chips and the processing chip H, wiring of 46 data transmission lines can be saved on a PCB where the processing chip H is located, so that the PCB design difficulty is simplified, or positions of other components may be reserved on the PCB, thereby optimizing the system architecture of the electronic device.

Figure 7:
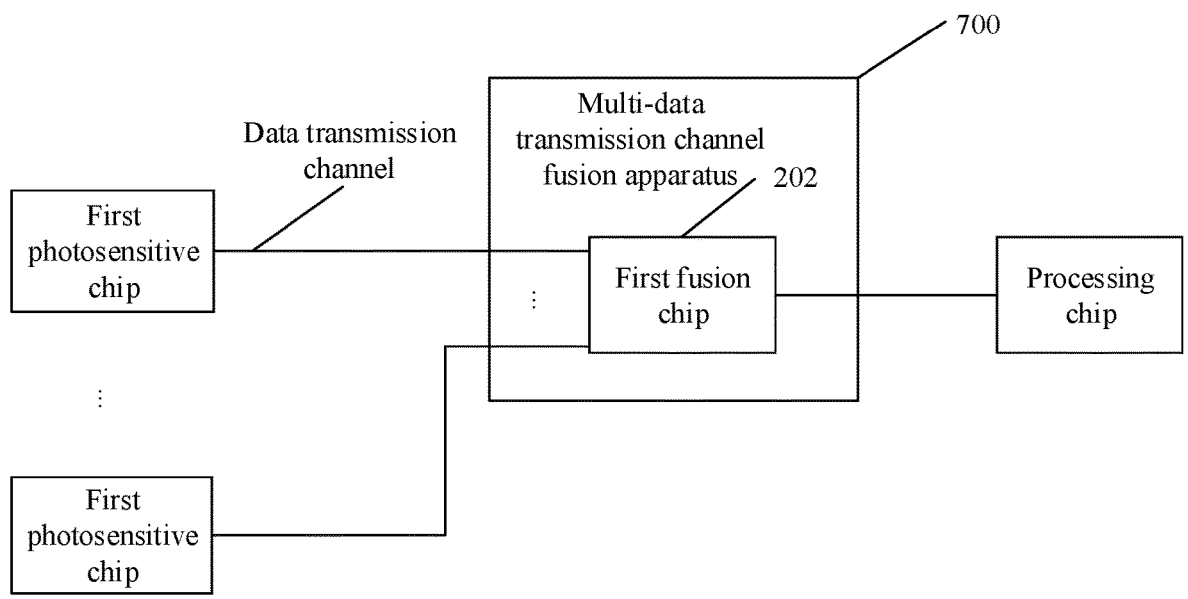
FIG. 7 is a schematic diagram of a structure of a multi-data transmission channel fusion apparatus according to an embodiment.

Based on a same inventive concept, an embodiment of this application provides a multi-data transmission channel fusion apparatus. As shown in FIG. 7, the apparatus 700 includes the first fusion chip 202 provided in the foregoing embodiments of this application.

The first fusion chip 202 is configured to converge data streams in a plurality of data transmission channels connected to a plurality of first photosensitive chips to obtain a first high-speed convergent data stream, and send the first high-speed convergent data stream to a processing chip by using one data transmission channel connected to the processing chip.

Optionally, the multi-data transmission channel fusion apparatus 700 may further include at least one second fusion chip.

Each second fusion chip is configured to be connected to a plurality of second photosensitive chips by using a plurality of data transmission channels, and be connected to the processing chip by using one data transmission channel; and each second fusion chip is configured to converge data streams in the plurality of data transmission channels connected to the plurality of second photosensitive chips, to obtain a second high-speed convergent data stream, and send the second high-speed convergent data stream to the processing chip by using the data transmission channel connected to the processing chip.

Figure 8:
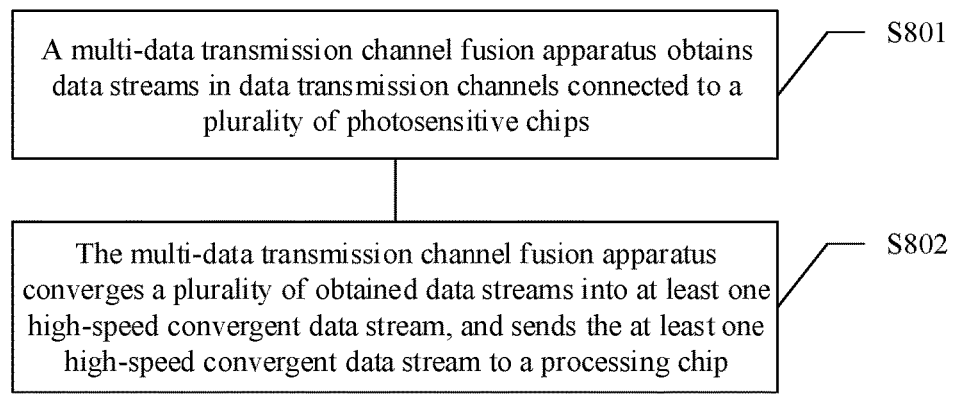
FIG. 8 is a schematic flowchart of a data transmission method according to an embodiment.

Based on a same inventive concept, an embodiment of this application further provides a multi-data transmission channel fusion method. The method may be performed by the multi-data transmission channel fusion apparatus 700 provided in the foregoing embodiment of this application. As shown in FIG. 8, the method specifically includes the following steps.

S801. The multi-data transmission channel fusion apparatus obtains data streams in data transmission channels connected to a plurality of photosensitive chips.

Specifically, the multi-data transmission channel fusion apparatus may be connected to one photosensitive chip by using one data transmission channel, to obtain a data stream generated by each photosensitive chip.

In an example, before data streams generated by a plurality of photosensitive chips are obtained, a control signal sent by a processing chip is received, and working parameters of the plurality of connected photosensitive chips are adjusted in response to the control signal, to obtain data streams of specific parameters.

S802. The multi-data transmission channel fusion apparatus converges a plurality of obtained data streams into at least one high-speed convergent data stream, and sends the at least one high-speed convergent data stream to a processing chip.

In an example, the plurality of data streams are numbered, and the plurality of numbered data streams are converged, to obtain at least one high-speed convergent data stream.

Specifically, the number may be set in packet headers and packet trailers of the plurality of data streams.

Figure 9:
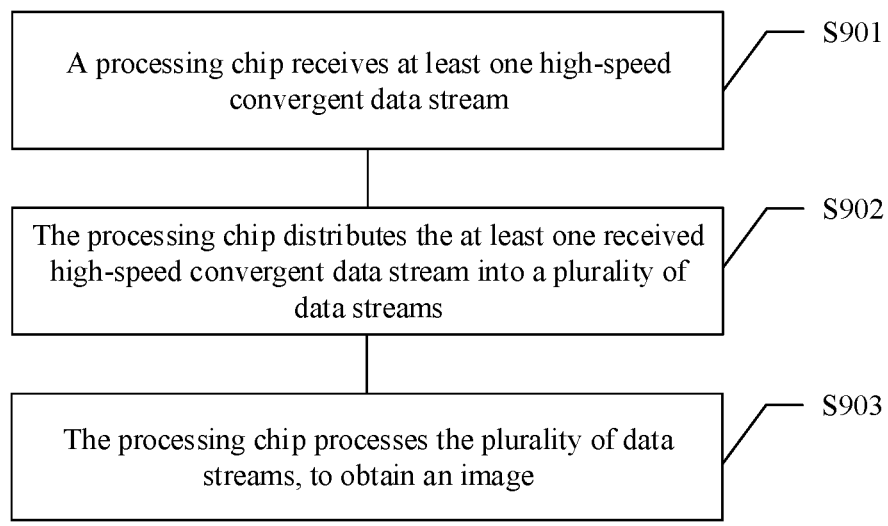
FIG. 9 is a schematic flowchart of a data processing method according to an embodiment.

Based on a same inventive concept, an embodiment of this application further provides a data processing method. The method may be performed by the processing chip in the electronic device provided in the foregoing embodiments of this application. As shown in FIG. 9, the method specifically includes the following steps.

S901. The processing chip receives at least one high-speed convergent data stream. Each high-speed convergent data stream includes a plurality of data streams generated by a plurality of photosensitive chips.

Specifically, the processing chip may be connected to each fusion chip in the foregoing multi-data transmission channel fusion apparatus, to obtain a plurality of data streams generated by a plurality of photosensitive chips connected to each fusion chip.

In an example, before receiving the at least one high-speed convergent data stream, the processing chip sends control signals to the plurality of photosensitive chips, to control working parameters of the plurality of photosensitive chips, so that the photosensitive chips output data streams of specific parameters.

Optionally, the processing chip can send the control signal to each fusion chip, and control, by using the fusion chip, a working parameter of a photosensitive chip connected to the fusion chip.

Specifically, after receiving the control signal, the fusion chip can send the control signal to the plurality of photosensitive chips, and directly control the working parameters of the plurality of photosensitive chips.

S902. The processing chip distributes the at least one received high-speed convergent data stream into a plurality of data streams.

Specifically, clock recovery is performed on the at least one high-speed convergent data stream, and the at least one high-speed convergent data stream after the clock recovery is distributed by using a numbered identifier in the at least one high-speed convergent data stream, to obtain a data stream corresponding to each photosensitive chip.

In an example, a data stream corresponding to each photosensitive chip is determined based on a plurality of data packet headers set in the at least one high-speed convergent data stream and numbers included in the data packet headers. The number is used to indicate a photosensitive chip that generates the original data stream.

In another example, a data stream corresponding to each photosensitive chip is determined based on a plurality of data packet headers and data packet trailers that are set in the at least one high-speed convergent data, where the data packet header and the data packet trailer include a number corresponding to the data packet header.

S903. The processing chip processes the plurality of data streams, to obtain an image.

Specifically, the plurality of data streams are processed by using an image signal processor, to obtain an image.

Optionally, packet headers and packet trailers in the plurality of data streams are removed by using an MIPI protocol, to obtain target data streams, and the target data streams are processed by using the image signal processor, to obtain the image.

Figure 10:
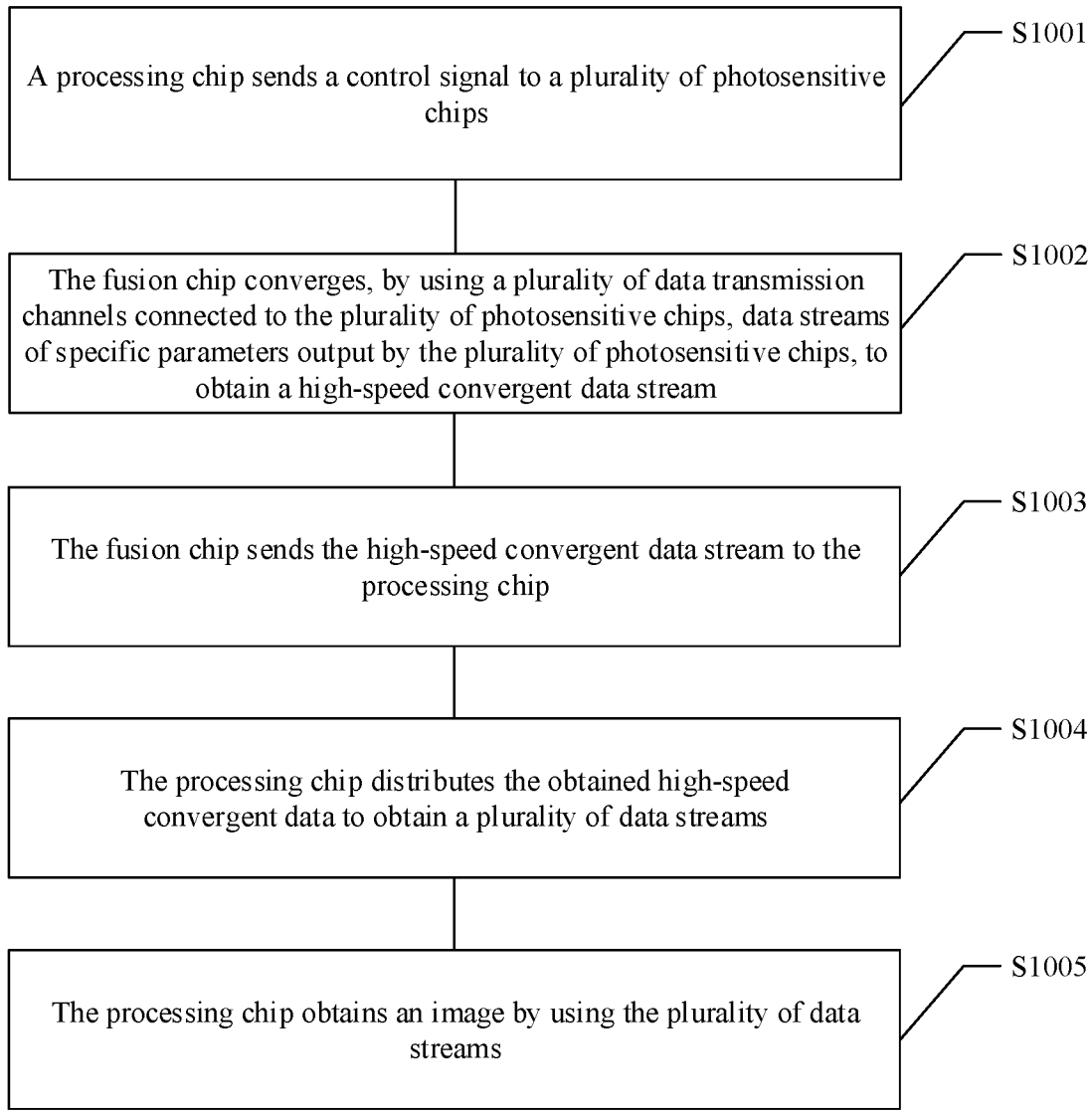
FIG. 10 is a schematic specific flowchart of data processing of an electronic device according to an embodiment.

With reference to descriptions in FIG. 8 and FIG. 9, a working process of the electronic device is described in detail by using an example in which the electronic device includes one fusion chip. Refer to FIG. 10. The following steps are specifically included.

S1001. A processing chip sends control signals to a plurality of photosensitive chips. The control signals are used to control working parameters of the plurality of photosensitive chips, so that the plurality of photosensitive chips generate data streams of specific parameters.

Optionally, if a first control channel is connected between the processing chip and the fusion chip, the processing chip sends the control signal to the fusion chip. The control signal is used to control the fusion chip to adjust the working parameters of the plurality of connected photosensitive chips.

Optionally, if second control channels are connected between the processing chip and the plurality of photosensitive chips, the processing chip directly controls the working parameters of the plurality of photosensitive chips by using the second control channels.

S1002. The fusion chip converges, by using a plurality of data transmission channels connected to the plurality of photosensitive chips, data streams of specific parameters output by the plurality of photosensitive chips, to obtain a high-speed convergent data stream.

S1003. The fusion chip sends the high-speed convergent data stream to the processing chip.

S1004. The processing chip distributes the obtained high-speed convergent data to obtain a plurality of data streams.

S1005. The processing chip obtains an image by using the plurality of data streams.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that persons skilled in the art can make various modifications and variations to embodiments of this application without departing from the spirit and scope of embodiments of this application. This application is intended to cover these modifications and variations provided that they fall within the scope of the following claims of this application and their equivalent technologies.

What is claimed is:

1. An electronic device, comprising:
a plurality of first photosensitive chips, each respective first photosensitive chip being configured to generate a corresponding respective mobile industry processor interface (MIPI) protocol-based data stream;
a first fusion chip configured to converge the plurality of data streams generated by the plurality of first photosensitive chips to obtain a first high-speed convergent data stream; and
a processing chip configured to receive the first high-speed convergent data stream and obtain an image by using the received data stream, the processing chip comprising:
an image signal processor,
a first signal receiving module,
a first distribution module, and
a first MIPI protocol processing module,
wherein each respective first photosensitive chip of the plurality of first photosensitive chips is connected to the first fusion chip via a respective photosensitive chip data transmission channel and configured to transmit the corresponding respective data stream to the first fusion chip via the connected respective photosensitive chip data transmission channel,
wherein the first fusion chip is connected to the processing chip via a fusion chip data transmission channel and is configured to send the first high-speed convergent data stream to the processing chip by using the fusion chip data transmission channel,
wherein the first signal receiving module is connected to the first fusion chip via the fusion chip data transmission channel and configured to receive the first high-speed convergent data stream output by the first fusion chip,
wherein the first distribution module is separately connected to the first signal receiving module and the first MIPI protocol processing module,
wherein the first distribution module is configured to receive the data stream output by the first signal receiving module, distribute the received data stream, obtain a plurality of data streams, and output the plurality of data streams to the first MIPI protocol processing module,
wherein the first MIPI protocol processing module is connected to the image signal processor and configured to receive the plurality of data streams output by the first distribution module, process the plurality of received data streams, and output the plurality of processed data streams to the image signal processor, and
wherein the image signal processor is configured to receive the plurality of processed data streams output by the first MIPI protocol processing module and obtain an image by using the plurality of received data streams.

2. The electronic device according to claim 1, wherein the first fusion chip comprises:
a fusion module,
a high-speed signal sending module, and
a plurality of receiving modules, each connected to a respective first photosensitive chip in a one-to-one correspondence;
wherein each respective receiving module is configured to receive a respective data stream and output the received data stream to the fusion module;
wherein the fusion module is separately connected to the high-speed signal sending module and each respective receiving module,
wherein the fusion module is configured to receive each respective data stream output by a corresponding respective receiving module, converge the plurality of received data streams into convergent data, and output the convergent data to the high-speed signal sending module, and
wherein the high-speed signal sending module is connected to the processing chip and is configured to convert the received convergent data into the first high-speed convergent data stream and then send the first high-speed convergent data stream to the processing chip via the fusion chip data transmission channel.

3. The electronic device according to claim 2, wherein the fusion module comprises:
   a first buffer module comprising a plurality of input ends, each respective input end corresponding to and connected to a respective receiving module, and a plurality of respective output ends, each respective output end corresponding to a respective input end, wherein the first buffer module is configured to buffer respective data streams output by respective connected receiving modules and to output the respective data streams via the corresponding output ends;
   a multiplexer comprising a plurality of input ends separately connected to different output ends of the first buffer module and further comprising an output end of the multiplexer connected to the high-speed signal sending module, the multiplexer being configured to converge a plurality of data streams buffered in the first buffer module into the convergent data and then output the convergent data to the high-speed signal sending module; and
   a first control module connected to a control end of the multiplexer, the first control module being configured to control the multiplexer to number the plurality of data streams buffered in the first buffer module and to converge the plurality of numbered data streams.

4. The electronic device according to claim 3, wherein the fusion module further comprises:
   a first data processing module, the first data processing module being connected to the output end of the multiplexer, the first data processing module being configured to process the convergent data output by the multiplexer and separately output the processed convergent data to the high-speed signal sending module and to a storage module configured to store the processed convergent data.

5. The electronic device according to claim 1, wherein the first distribution module comprises:
   a data distributor,
   a second control module, and
   a second buffer module;
   wherein an input end of the data distributor is connected to the first signal receiving module, a plurality of output ends of the data distributor are connected to the second buffer module, and the data distributor is configured to receive data output by the first signal receiving module and to distribute the received data into a plurality of data streams;
   wherein the second buffer module is configured to receive and buffer the plurality of data streams output by the data distributor and output the plurality of buffered data streams to the first MIPI protocol processing module; and
   wherein the second control module is connected to a control end of the data distributor, and the second control module is configured to control the data distributor to distribute the data received by the data distributor, to obtain the plurality of data streams.

6. The electronic device according to claim 1, further comprising:
   a first control channel between the processing chip and the first fusion chip, wherein the processing chip is configured to instruct, by using the first control channel, the first fusion chip to control working parameters of the plurality of first photosensitive chips, and/or second control channels between the processing chip and the plurality of first photosensitive chips, wherein the processing chip is configured to directly control working parameters of the plurality of first photosensitive chips by using the second control channels.

7. The electronic device according to claim 1, further comprising:
   a plurality of second photosensitive chips and at least one second fusion chip,
   wherein each respective second photosensitive chip is connected to a respective corresponding second fusion chip of the at least one second fusion chip via a corresponding respective second photosensitive chip data transmission channel, each respective second photosensitive chip being configured to generate a respective MIPI protocol-based data stream and to transmit the respective data stream to the connected respective corresponding second fusion chip by using the corresponding respective second photosensitive chip data transmission channel;
   wherein each respective second fusion chip of the at least one second fusion chip is connected to the processing chip by a respective second fusion chip data transmission channel, each second fusion chip being configured to converge data streams received via a plurality of respective second photosensitive chip data transmission channels connected to respective second photosensitive chips, to obtain a second high-speed convergent data stream, and to send the second high-speed convergent data stream to the processing chip via the corresponding respective second fusion chip data transmission channel;
   wherein the processing chip further comprises at least one second signal receiving module being in a one-to-one correspondence with the at least one second fusion chip, at least one second distribution module being in a one-to-one correspondence with the at least one second signal receiving module, and at least one second MIPI protocol processing module in a one-to-one correspondence with the at least one second distribution module,
   wherein each respective second signal receiving module is configured to be connected to a corresponding respective second fusion chip via a corresponding respective data transmission channel and is configured to receive a respective second high-speed convergent data stream output by the connected corresponding respective second fusion chip;
   wherein each respective second distribution module is connected to a corresponding respective second signal receiving module and a corresponding respective second MIPI protocol processing module, each respective second distribution module being configured to receive data output by the connected corresponding respective second signal receiving module, distribute the received data, obtain a plurality of data streams, and output the plurality of data streams to the connected corresponding respective second MIPI protocol processing module; and
   wherein each respective second MIPI protocol processing module is connected to the image signal processor, each respective second MIPI protocol processing module being configured to receive the plurality of data streams output by the connected corresponding respective second distribution module, process the plurality of received data streams, and output processed data streams to the image signal processor.

8. A multi-data transmission channel fusion apparatus, comprising:
a first fusion chip configured to:
converge data streams in a plurality of photosensitive chip data transmission channels connected to a plurality of first photosensitive chips,
obtain a first high-speed convergent data stream, and
send the first high-speed convergent data stream to a processing chip via a fusion chip data transmission channel connected to the processing chip; and
a processing chip configured to receive the first high-speed convergent data stream and obtain an image by using the received data stream, the processing chip comprising:
an image signal processor,
a first signal receiving module,
a first distribution module, and
a first MIPI protocol processing module,
wherein the first signal receiving module is connected to the first fusion chip via the fusion chip data transmission channel and configured to receive the first high-speed convergent data stream output by the first fusion chip,
wherein the first distribution module is separately connected to the first signal receiving module and the first MIPI protocol processing module,
wherein the first distribution module is configured to receive the data stream output by the first signal receiving module, distribute the received data stream, obtain a plurality of data streams, and output the plurality of data streams to the first MIPI protocol processing module,
wherein the first MIPI protocol processing module is connected to the image signal processor and configured to receive the plurality of data streams output by the first distribution module, process the plurality of received data streams, and output the plurality of processed data streams to the image signal processor, and
wherein the image signal processor is configured to receive the plurality of processed data streams output by the first MIPI protocol processing module and obtain an image by using the plurality of received data streams.

9. The apparatus according to claim 8, further comprising:
a second fusion chip connected to a plurality of second photosensitive chips via a plurality of second photosensitive chip data transmission channels and to be connected to the processing chip via a second fusion chip data transmission channel, the second fusion chip being configured to:
converge data streams in the plurality of second photosensitive chip data transmission channels to obtain a second high-speed convergent data stream, and
send the second high-speed convergent data stream to the processing chip by using the second fusion chip data transmission channel connected to the processing chip.

10. A multi-data transmission channel fusion method, comprising:
obtaining a plurality of data streams via a plurality of data transmission channels connected to a plurality of photosensitive chips;
converging the plurality of obtained data streams into at least one high-speed convergent data stream; and
sending the at least one high-speed convergent data stream to a processing chip, wherein the processing chip comprises:
an image signal processor,
a first signal receiving module,
a first distribution module, and
a first MIPI protocol processing module,
wherein the first signal receiving module configured to receive the at least one high-speed convergent data stream via a fusion chip data transmission channel,
wherein the first distribution module is separately connected to the first signal receiving module and the first MIPI protocol processing module,
wherein the first distribution module is configured to receive a data stream output by the first signal receiving module, distribute the received data stream, obtain a plurality of data streams, and output the plurality of data streams to the first MIPI protocol processing module,
wherein the first MIPI protocol processing module is connected to the image signal processor and configured to receive the plurality of data streams output by the first distribution module, process the plurality of received data streams, and output the plurality of processed data streams to the image signal processor, and
wherein the image signal processor is configured to receive the plurality of processed data streams output by the first MIPI protocol processing module and obtain an image by using the plurality of received data streams.

11. The method according to claim 10, wherein the converging the plurality of obtained data streams into the at least one high-speed convergent data stream comprises:
numbering the plurality of obtained data streams and converging the plurality of numbered data streams to obtain the at least one high-speed convergent data stream.

12. The method according to claim 10, wherein before the obtaining the plurality of data streams via the plurality of data transmission channels connected to the plurality of photosensitive chips, the method further comprises:
receiving a control signal sent by the processing chip and adjusting working parameters of the plurality of connected photosensitive chips in response to the control signal.

13. A data processing method, comprising:
receiving, by a first signal receiving module of a processing chip and from a first fusion chip via a fusion chip data transmission channel, at least one high-speed convergent data stream, wherein each high-speed convergent data stream comprises data streams generated by a plurality of photosensitive chips;
distributing, by a first distribution module of the processing chip, the at least one received high-speed convergent data stream into a plurality of distributed data streams,
obtaining, by the first distribution module, a plurality of data streams,
outputting, by the first distribution module, the plurality of data streams to a first MIPI protocol processing module of the processing chip; and
processing, by the first MIPI protocol processing module, the plurality of data streams received from the first distribution module;
outputting, by the first MIPI protocol processing module, a plurality of processed data streams; and
receiving, by an image signal processor of the processing chip, the plurality of processed data streams output by the first MIPI protocol processing module to obtain an image, wherein the first distribution module is separately connected to the first signal receiving module and the first MIPI protocol processing module.

14. The method according to claim 13, wherein the distributing the at least one received high-speed convergent data stream into a plurality of distributed data streams comprises:
    performing clock recovery on the at least one high-speed convergent data stream; and
    distributing, by using a numbered identifier in the at least one high-speed convergent data stream, the at least one high-speed convergent data stream after the clock recovery, to obtain a respective data stream corresponding to each respective photosensitive chip.

15. The method according to claim 13, wherein before the receiving the at least one high-speed convergent data stream, the method further comprises:
    sending control signals to the plurality of photosensitive chips, wherein the control signals specify working parameters of the plurality of photosensitive chips, so that the plurality of photosensitive chips generate data streams.

* * * * *